Dec. 25, 1934.   A. W. ALTORFER   1,985,273
DRIVING AND CLUTCH MECHANISM FOR WASHING MACHINES
Filed May 18, 1932   3 Sheets-Sheet 3
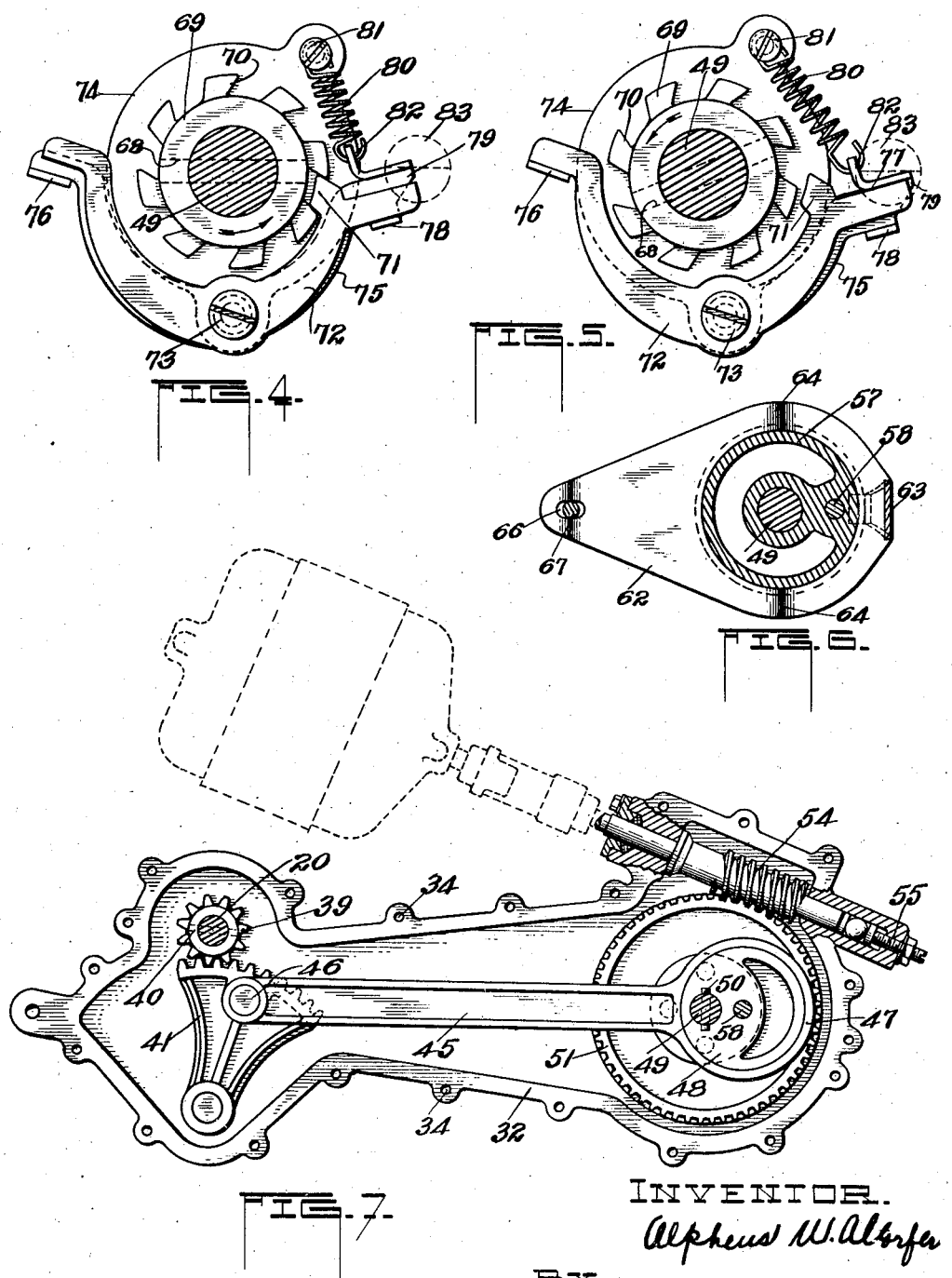

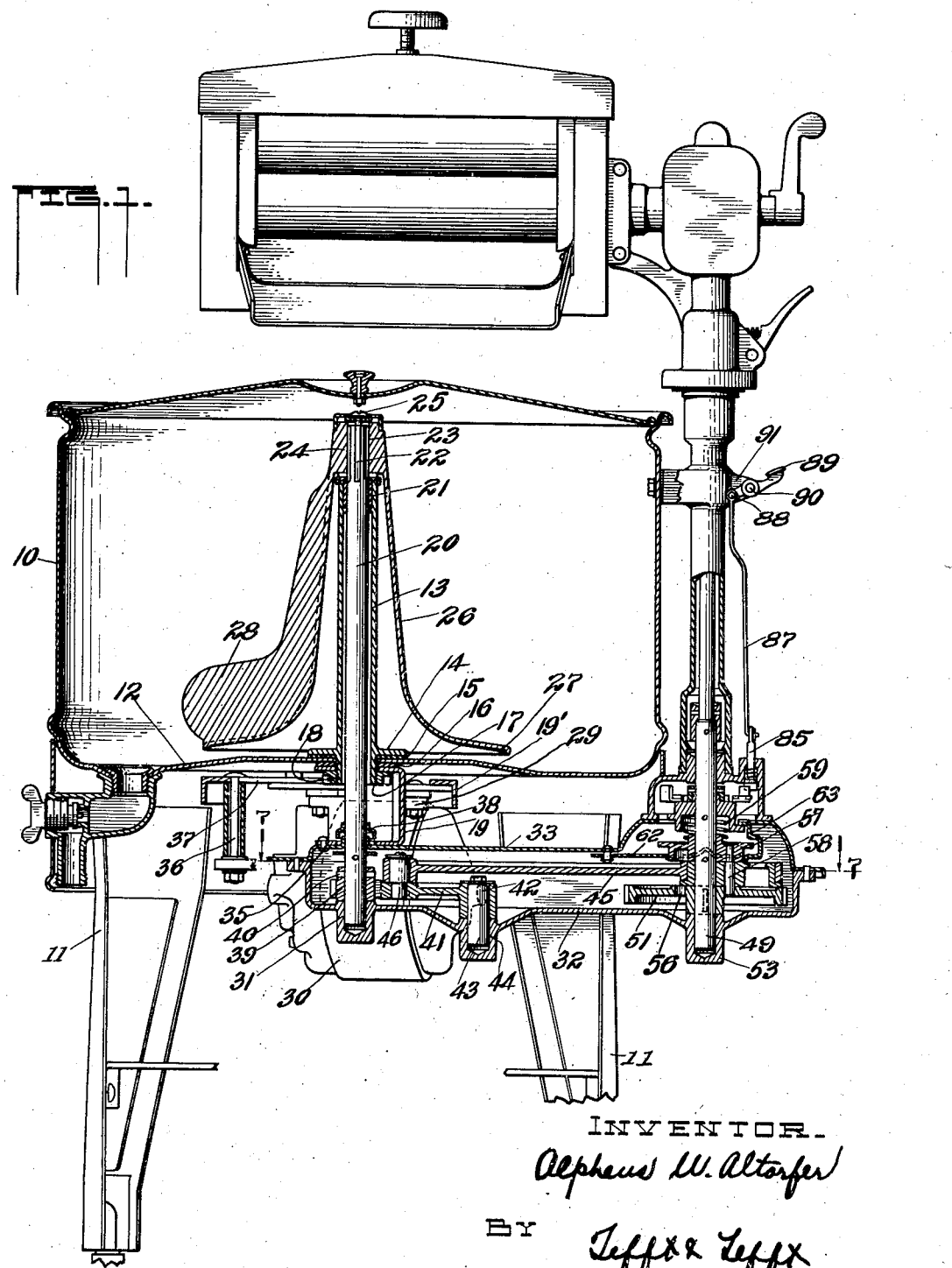

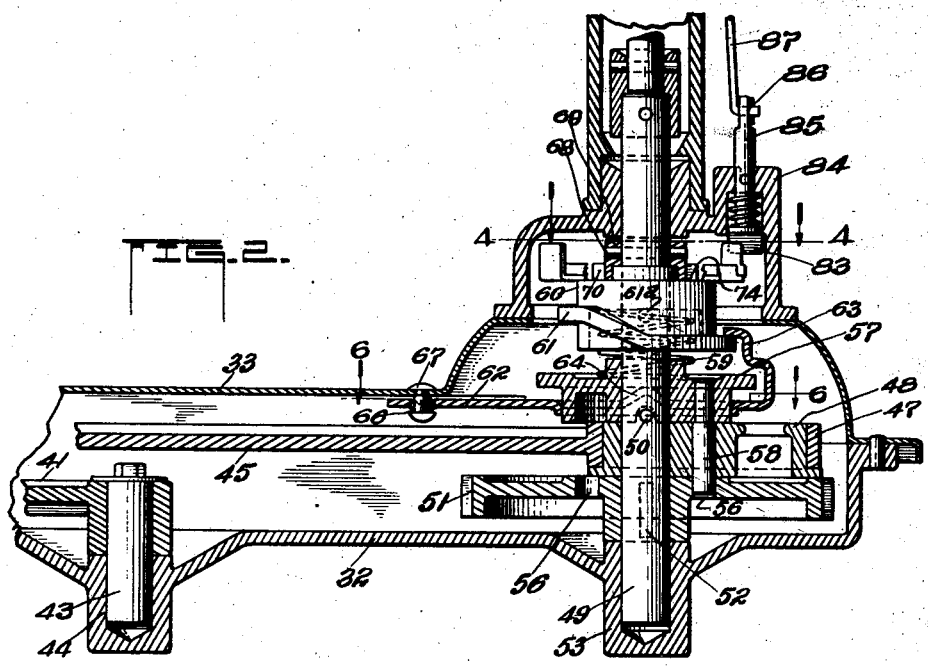

Patented Dec. 25, 1934

1,985,273

UNITED STATES PATENT OFFICE 1,985,273

DRIVING AND CLUTCH MECHANISM FOR WASHING MACHINES

Alpheus W. Altorfer, Peoria, Ill.

Application May 18, 1932, Serial No. 611,982

2 Claims. (Cl. 259—101)

This invention relates to driving and clutch mechanism for washing machines.

One of the objects of the invention lies in the provision of a driving mechanism for the water-agitating element of a washing machine and clutch mechanism in connection with the driving mechanism, which is operated by the slightest touch of the operator.

Another object lies in the provision of a clutch mechanism for the drive portions of a washing machine, said clutching mechanism comprising a power driven clutch operating mechanism and a lever operable by the slightest touch of the operator for controlling the movement of said clutch operating mechanism.

Still another object lies in the provision of drive mechanism for the water-agitating portions of a washing machine, said drive mechanism having in connection therewith a clutch member operated by a clutch-operating mechanism and a lever operable by the slightest touch for controlling the movement of the clutch-operating mechanism.

A further object lies in the provision of drive mechanism for the water-agitating portions of a washing machine and means for controlling the movement of the drive mechanism, including a clutch co-operatively related to the driving mechanism, a power driven clutch-operating mechanism and a lever under the control of the operator for optionally engaging and disengaging the clutch-operating mechanism which in turn controls the movement of the clutch member.

A still further object lies in the provision of drive mechanism for the water-agitating portion of a washing machine, a wringer drive shaft operatively connected to the drive mechanism, clutch mechanism controlling the operation of the water-agitating member, clutch-operating mechanism disposed upon, and controlled by the movement of, the wringer drive shaft, and a lever operated by the slightest movement for optionally controlling the movement of the clutch-operating mechanism and hence controlling the clutching of the drive mechanism through the water-agitating member.

Yet a further object lies in the provision of a washing machine having a water-agitating member therein driven by a shaft vertically disposed within the tub and projecting through the bottom thereof, means for reciprocating the vertical drive shaft comprising a driving mechanism carried in a horizontally disposed oil-tight casing beneath the tub, said casing being supported centrally beneath the tub at its inner end, and said casing providing a support and driving connection for the wringer drive shaft at its opposite end, a substantially vertically disposed wringer drive shaft operatively connected to the driving mechanism and clutch mechanism controlling the reciprocation of the vertical drive shaft and water-agitating member including a clutch member, a clutch-operating mechanism, power driven from the wringer drive shaft, and means controlled by the slightest touch of the operator controlling the operation of the clutch-controlling operation, and hence the clutch member.

Other objects will appear in the following specification, taken in connection with the annexed drawings, in which—

Fig. 1 is an elevational view with clutch, transmission and agitator shown in section.

Fig. 2 is an enlarged fragmentary sectional view of clutch members and associate parts, showing the clutch in its engaged position, as it appears in Fig. 1.

Fig. 3 is a similar view to that shown in Fig. 2, the clutch members being shown in their declutched positions.

Fig. 4 is an enlarged plan view of the clutch operating members taken on the line 4—4 of Fig. 2, the clutch operating members being shown in their engaged or operating positions.

Fig. 5 is a plan view similar to Fig. 4, showing the clutch operating members in their inoperative or neutral positions.

Fig. 6 is a plan view of the clutch operating yoke and associate parts which are shown in section and taken on line 6—6 of Fig. 2.

Fig. 7 is a plan view of transmission and clutch members with certain parts broken away, the prime mover being indicated in dotted lines; said figure being taken on line 7—7 of Fig. 1.

Before referring specifically to the drawings for a detail description thereof, it might be well to state at this time certain circumstances surrounding the development of the invention herein disclosed and later to be described.

The inventive thought contained in this application is directed to an important step in washing machines and particularly the driving mechanism therefor, in that the results of said invention, as far as the operation thereof is concerned, reflects obvious and immediate benefit to the operator, as well as furnishing a type of clutching mechanism which adapts itself in a simple and effective manner to the driving portions of a power washer. In other words, applicant has simplified the clutching and de-clutching operation of the drive mechanism of a power washing machine by providing a lever controlling this clutching operation, said lever being capable of operation by the slightest touch of the operator.

It is admitted that the art will show many different types of driving and clutch mechanism for the water-agitating element of a washing machine; however, it is believed that for the first time there has been disclosed a clutch mechanism which in turn is operated by the power movement of the wringer driving mechanism rather than by the physical effort of the operator.

In a clutching mechanism of the character now to be described, the operator, who usually is a woman, merely gives the slightest touch of her finger to the clutch-controlling lever to accomplish the clutching operation. Applicant has introduced between the clutch itself and the clutch-control lever a power driven clutch controlled member which actually accomplishes the clutching operation and therefore leaves for the operator merely the movement of the lever by the slightest touch for commencing its operation. Further, applicant has associated his clutch and clutch-operating mechanism with the driving means for the water-agitating element and the wringer drive shaft with a minimum of parts and a simplicity of operation which permits the production of the mechanism at a minimum cost, as well as furnishing a clutch mechanism which may be controlled by the slightest touch of the operator from any point upon the washing machine structure that is desired.

Referring specifically to the drawings, in Fig. 1 thereof is a general disclosure of a standard power washing machine of the underneath or sub-agitator type. A tub 10 is suitably supported by plural leg portions 11 in the ordinary manner. The bottom 12 of the tub is apertured at a central point and projecting vertically within the tub is a column 13 which extends upwardly to a point above the normal water level within the tub. The column 13 has a water-tight connection with the bottom of the tub through the flange 14 and dual packing members 15 and 16.

The lower end of the column is threaded as at 17 and is held in a fixed vertical position with respect to the tub by means of the nut 18 threaded upon its lower end. It will be noticed that the nut 18 also secures a supporting bracket 19 fixedly upon the lower end of the column 13, this bracket holding the packing 16 firmly against the bottom of the tub.

A drive shaft 20 projects vertically within the column 13 and finds upper bearing support 21 in the upper part of column 13. The upper end 22 of the drive shaft is secured in the manner shown at 23 to the upper end 24 of the water-agitating member. The connection of the agitator with the drive shaft, as shown, is of a fixed nature, although by removal of the screw 25 the agitator may be completely detached from the drive shaft.

The agitator herein described has the cone portion 26 surrounding the column 13 and the base 27 of the agitator lying immediately adjacent the bottom of the tub and there being provided a plurality of upstanding water-agitating blades 28 thereon.

The supporting bracket 19' has bolted thereto, as at 29 the conventional electric motor 30. The motor has been shown as the prime mover in the present machine, although it is obvious in this character of machine that any other motive power such as a gasoline engine, might just as well be used without departing in the least from the inventive thought herein shown.

The lower end of the vertical shaft 20 finds a bearing support 31 in an integrally cast or stamped base 32 of an oil-tight transmission housing, which has the cover plate 33 secured thereto in the plural manner as perhaps best shown in and by the threaded apertures 34 shown in Fig. 7.

This transmission houses not only the transmission but also the clutch-operating mechanism, which forms the basis for the present application. It will be noted, however, that the transmission casing is swung in a horizontal manner below the tub, and that the inner end of the casing is held in a fixed position by means of the connection 35 with the before mentioned supporting bracket 19.

An additional support for the inner end of the transmission casing is provided in a second connection with the vertically disposed bolt member 36, which in turn is carried by a bracket 37 also carried by or connected to the bracket 19'.

Attention is directed to the manner of carrying the inner end of the transmission casing in a centrally supported manner.

A collar 38 surrounding the vertical shaft 20 prevents any possibility of water entering the transmission case around the shaft 20. A pinion 39 is keyed as at 40 to the shaft 20 at a point within the casing. A segment gear 41 is secured as at 42 to the pivot 43, which in turn finds its bearing support 44 in the base of the transmission casing 32. A reach member 45 is pivotally connected as at 46 to the segment gear 41 at a point adjacent the teeth portion thereof. The outer end of the reach member forms a strap 47 which in turn surrounds an eccentric 48.

The member 48 is carried in an eccentric and free manner upon the vertically disposed wringer drive shaft 49. A lateral pin 50 holds the eccentric upon a worm gear 51 which is keyed as at 52 to the lower end of the shaft 49. It will be noted that the wringer shaft finds its bearing support 53 also in the integrally cast base 32 of the transmission casing.

Referring to Fig. 7 of the drawings, it will be seen that the worm gear 51 is driven in the conventional manner by means of the worm 54 which also finds its support in the transmission case as well as the adjustable take-up 55 therefor.

As stated before, an electric motor has been shown in dotted lines as the prime mover, although any other motive power may be used for rotating the worm, which in turn rotates the gear in a clutch relationship with the eccentric, also moves the eccentric 48 with consequent reciprocation of the reach 45, segment gear 41, pinion 39, drive shaft 20 and the water-agitating member connected thereto.

Mechanism for clutching the eccentric 48 to the worm gear 51 is provided in the following mechanism. Plural apertures 56 in the worm gear 51 provide the female portions of the clutch. The male portion of the clutch is found in the clutch plate 57, which carries the depending clutch pin or male portion of the clutch 58.

Referring to Figs. 2 and 3 of the drawings, it is found that the clutch plate 57 is normally held in a tensioned manner towards the eccentric 48 by means of the coil spring 59 which surrounds the shaft 49. It is apparent that the plate 57 is carried freely on the shaft 49.

The upper end of the spring 59 is held from further movement by a clutch-operating member 60 loosely mounted on the shaft 49, said member having formed thereon a clutch operating cam surface 61. A lateral pin 61a provides a support for member 60 with respect to the remaining portions of the clutch-operating mechanism now to be described.

A clutch-operating yoke 62 has its upwardly extending cam controlled portion 63 carried by the mentioned cam 61. The yoke, as shown in Fig. 6, normally holds the clutch plate 57 and portion 60 in an assembled relationship, the yoke having an intermediate bulged or upraised portion 64 to permit same to have a swinging seat between the yoke 62 and clutch plate 57.

It will be noted also that the clutch plate 57 is cut away as at 65 to permit such downward movement thereof as to accomplish the clutch connection with the gear 51.

Referring to Fig. 6, it is found that the clutch plate 60 is held in a normal stationary manner in the yoke 62, that the wringer shaft is rotatable therein, and further that the yoke has a loose connection 66 with the pin 67 secured to the cover plate for the transmission. This loose connection permits upward and downward movement of the yoke 62 and thus de-clutching and clutching of the eccentric with the worm gear, the yoke, of course, being controlled by movement of the member 60 or more particularly by the relationship of the yoke with the clutch-operating cam surface 61.

Disposed immediately above the member 60 and connected to the wringer shaft 49 by means of the lateral pin 68 is a collar 69 having the plural ratchet portions 70 integrally formed thereon. This ratchet portion 70 is adapted to co-operate with a pawl 71 formed upon an arm 72 pivoted as at 73 upon a plate 74 which is either integrally formed with or forms a part of the previously mentioned portion 60 which carries the clutch-operating cam surface 61.

The arm 72 has disposed thereunder a second and co-operating arm portion 75. Arm 75 also finds the same pivot 73 on the plate 74, the opposite end of the arm 75 having the pawl-operating portions 76 and 77.

It will be noted that the arm 72 generally conforms to the shape of the arm 75 and immediately overlies said arm. As a matter of fact, the arm 75 has an upwardly extending lug 78 thereon and an extending end portion 79 of the arm 72 is carried between the operating surface 77 and the lug 78. The arm 75 is held in a spring tensioned relation with respect to plate 74 by means of the coil spring 80 connected as at 81 to the plate 74 and at its opposite end at 82 to the pawl operating surface 77. It is obvious that this spring normally tends to draw the arm 75 and thus the pawl 71 towards the ratchet teeth 70. It will be noted that the ratchet turns in the counter-clockwise manner as indicated by the arrows in Fig. 5.

It might be well to explain that a single pivoted arm similar to 72 might be used for the purpose of engaging the plate 74 and thus member 60 with the constantly rotating ratchet 69 pinned to the wringer shaft; however, by using the overlying dual pawl operating arms it has been found and will be noted from a careful consideration of the drawings, that there is a slight take-up and thus a tensioned withdrawal of the pawl 71 from the ratchet teeth.

The mechanism just described permits removal of the pawl without jar, which might possibly attend the use of a single arm.

A manually operated means for controlling the operation of the pawl 71, and thus the operation of the clutch-operating mechanism, and finally the clutch mechanism itself, is found in a lug 83 carried in a spring tensioned manner as shown at 84, upon a reach 85 which in turn is secured at its upper end as at 86 to a connecting member 87 which is connected at its upper end as at 88 to a manually operated lever 89 pivoted as at 90 upon a bracket 91 formed upon the supporting column for the wringer drive shaft. Obviously, a slight pressure upon the lever 89 withdraws the lug 83 from engagement with either of the pawl operating surfaces 76 and 77 and the release of the lug instantly due to the spring tensioned relationship, drops the lug again downwardly into the path of the following pawl-operating surface.

As far as the operation of my clutch and clutch-operating mechanism is concerned, it might be stated that the manner of disposing the agitator within the tub and the drive therefor as well as the vertical shaft mounting thereof and reciprocating means therefor is generally conventional, except for the particular manner of supporting the transmission casing in a central manner below the tub. The power means for reciprocating the reach 45 and segment gear 41 in mesh with the pinion 39, is accomplished by the conventional worm and worm gear drive. Any type of prime mover may be used which would rotate the worm.

The means for clutching the eccentric 48 to the worm wheel is accomplished by upward and downward movement of the clutch plate 57 which carries the male member 58 which is adapted to be received in the female portion 56 of the worm wheel.

The actual clutching and de-clutching operation in the present instance is accomplished by the rotational movement of the wringer shaft 49.

Considering that the operator has with the slightest touch, moved the lever 89 downwardly in such manner as to withdraw the lug 83 from the path of the pawl operating surfaces 76 or 77, then in this event, due to the tensioning of the coil spring 80 the pawl 71 will be permitted to engage the teeth portion of ratchet 70, and thus the plate 74 will be rotated in a counter-clockwise movement by the ratchet which is pinned to the constantly rotating wringer drive shaft. Rotary movement of the plate 74 in turn rotates the member 60 upon which member is formed the clutch-operating cam surface 61. The movement of this cam surface is transmitted directly to the yoke 62 with the result that the yoke is moved in either an upward or downward manner, the direction of movement being controlled directly by the position of the cam surface when the operator moves the manual lever 89 downwardly.

Assuming that the cam surface permits the yoke to be moved downwardly, assisted by the tension of the coil spring 59, it will be noted that the plate 57 will in turn be moved downwardly with the result that the male portion 58 of the clutch will finally be received in the female portion 56 formed on the worm wheel 51. Thus it will be seen that there is no manual operation of the clutch mechanism whatsoever, and that the operator has merely, with the slightest pressure, to remove the lug 83 from engagement with the pawl controlled surfaces 86 and 87, whereupon and thereafter it is the movement or rather the power occasioned by the rotation of the wringer shaft which operates the clutch-operating mechanism to accomplish either the clutching or de-clutching of the eccentric 48 with the worm gear 51.

Although it is the clutching operation that has been described, it must be noted that immediately following the clutching of the eccentric 48 with the worm gear 51, the following pawl operating surface will immediately thereafter strike the again interposed lug 83 in such manner as to accomplish withdrawal of the pawl 71 from the ratchet teeth and hence stop the further operation of the clutch-operating portions.

As far as the de-clutching operation is concerned, the operator again has merely by slight manual touch, to remove the lug 83 from the path of the pawl controlling surface, with a consequent similar movement of parts, but in this instance with a movement of a different surface of the clutch-operating cam surface and a consequent elevation of the yoke 62 against the tension of the spring 59, which operation, of course, moves the plate 57 upwardly with a final withdrawal of the pin 58 from the apertures 56 and a de-clutching of the eccentric with the worm wheel.

What I claim is:

1. In a washing machine having a container, an agitator therein, an agitator shaft projecting through the bottom of the container, a second shaft disposed adjacent the side of the container, power driven means for imparting a reciprocatory movement to the agitator shaft and for driving said second shaft in a continuous manner, and a clutch on the constantly driven shaft for controlling the movement imparted to the agitator shaft and mechanism for actuating the clutch associated with the constantly driven shaft and adapted to be driven thereby to actuate the clutch, and a manually operated member for controlling the powered clutch actuating mechanism, said member being responsive to a comparatively slight pressure by the operator.

2. In a washing machine having a container, an agitator therein, an agitator shaft projecting through the bottom of the container, a second shaft disposed adjacent the side of the container, power driven means for imparting a reciprocatory movement to the agitator shaft and for driving said second shaft in a continuous manner, a clutch on the constantly driven shaft for controlling the movement imparted to the agitator shaft and cam mechanism for actuating the clutch associated with the constantly driven shaft and adapted to be operated thereby to actuate the clutch, and a manually operated member for controlling said power actuated cam mechanism, said member being responsive to a comparatively slight pressure by the operator.

ALPHEUS W. ALTORFER.